US012440848B2

(12) United States Patent
DiCicco et al.

(10) Patent No.: US 12,440,848 B2
(45) Date of Patent: *Oct. 14, 2025

(54) MEDIA HOLDERS WITH CROSS MEMBERS FOR SAMPLE PREPARATION

(71) Applicant: The Government of the United States of America, as represented by the Secretary of Homeland Security, Washington, DC (US)

(72) Inventors: Joseph A. DiCicco, Cape May Court House, NJ (US); Andrew Horan, Mays Landing, NJ (US); John Brady, Medford, NJ (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/022,631

(22) Filed: Jan. 15, 2025

(65) Prior Publication Data

US 2025/0153185 A1 May 15, 2025

Related U.S. Application Data

(63) Continuation of application No. 18/605,692, filed on Mar. 14, 2024, now Pat. No. 12,201,986, which is a continuation of application No. 17/948,689, filed on Sep. 20, 2022, now Pat. No. 11,958,053.

(60) Provisional application No. 63/246,609, filed on Sep. 21, 2021.

(51) Int. Cl.
*B01L 9/00* (2006.01)

(52) U.S. Cl.
CPC ......... *B01L 9/523* (2013.01); *B01L 2200/028* (2013.01)

(58) Field of Classification Search
CPC ...... B01L 9/523; B01L 9/52; B01L 2200/028; B01L 2200/025; B01L 2300/0809
USPC .............................................. 211/41.1, 132.1
See application file for complete search history.

(56) References Cited

U.S. PATENT DOCUMENTS

| | | | | |
|---|---|---|---|---|
| 701,129 | A * | 5/1902 | Belknap | A47L 4/00 134/171 |
| 2,880,865 | A | 4/1959 | Knox | |
| 3,713,771 | A | 1/1973 | Taylor et al. | |
| 3,992,265 | A | 11/1976 | Hansen | |
| 4,319,841 | A | 3/1982 | Suovaniemi et al. | |
| D269,702 | S | 7/1983 | Suovaniemi et al. | |
| 4,659,222 | A | 4/1987 | Ekholm | |
| 4,682,891 | A | 7/1987 | de Macario et al. | |
| 4,877,659 | A | 10/1989 | Vince | |

(Continued)

FOREIGN PATENT DOCUMENTS

| | | |
|---|---|---|
| CN | 208255244 U | 12/2018 |
| FR | 2260110 | 8/1975 |
| WO | 2005121745 A1 | 12/2005 |

*Primary Examiner* — Stanton L Krycinski
(74) *Attorney, Agent, or Firm* — Kelly G. Hyndman; Robert W. Busby

(57) ABSTRACT

A media holder can be used for preparing samples. The media holder can comprise a base, a pair of walls extending upwardly from the base, and a plurality of transverse members positioned on and coupled to a respective upper end of each of the walls. Each of the transverse members can define a receiving slot for receiving at least a portion of a media therein.

30 Claims, 13 Drawing Sheets

(56) References Cited

U.S. PATENT DOCUMENTS

| | | | |
|---|---|---|---|
| 4,948,564 A | 8/1990 | Root et al. | |
| 5,084,246 A | 1/1992 | Lyman et al. | |
| 5,096,672 A | 3/1992 | Tervamäki et al. | |
| 5,128,105 A | 7/1992 | Berthold et al. | |
| 5,308,584 A | 5/1994 | Vauramo | |
| RE34,841 E | 1/1995 | Suovaniemi et al. | |
| 5,514,343 A | 5/1996 | Verwohlt et al. | |
| 5,650,125 A | 7/1997 | Bosanquet | |
| 5,967,356 A | 10/1999 | Laarhoven et al. | |
| 6,020,995 A | 2/2000 | Dreyer et al. | |
| 6,096,562 A | 8/2000 | Bunn et al. | |
| 6,118,582 A | 9/2000 | Del Buono | |
| 6,508,986 B1 | 1/2003 | Anderson et al. | |
| 6,660,232 B1 | 12/2003 | Krueger et al. | |
| 7,449,153 B2 | 11/2008 | Sakal et al. | |
| 7,516,934 B2 | 4/2009 | Chu et al. | |
| 7,576,912 B2 | 8/2009 | Schütze et al. | |
| 7,785,538 B2 | 8/2010 | Kawahara | |
| 8,398,941 B2 | 3/2013 | Sinclair et al. | |
| 9,358,543 B2 | 6/2016 | Sampson et al. | |
| 9,782,777 B2 | 10/2017 | Mortillaro et al. | |
| 9,802,200 B2 | 10/2017 | Taylor et al. | |
| 10,948,507 B2 | 3/2021 | Sasaki et al. | |
| 2002/0009397 A1* | 1/2002 | Hirono | B01L 9/06 211/74 |
| 2004/0182770 A1 | 9/2004 | Clark et al. | |
| 2005/0079517 A1 | 4/2005 | Goncharko et al. | |
| 2005/0118711 A1 | 6/2005 | Nordheim et al. | |
| 2005/0135974 A1 | 6/2005 | Harvey et al. | |
| 2005/0265901 A1 | 12/2005 | Sinclair et al. | |
| 2009/0117011 A1 | 5/2009 | Morrison | |
| 2017/0252748 A1 | 9/2017 | Jonca et al. | |
| 2020/0316608 A1 | 10/2020 | Kojima et al. | |
| 2021/0370307 A1 | 12/2021 | Boardman et al. | |
| 2022/0128470 A1 | 4/2022 | Rager | |

* cited by examiner

MEDIA HOLDERS WITH CROSS MEMBERS FOR SAMPLE PREPARATION

CROSS-REFERENCE TO RELATED APPLICATIONS

This application is a nonprovisional continuation application that claims the benefit of priority from U.S. patent application Ser. No. 18/605,692 entitled "Media Holders with Sub-Members for Sample Preparation," filed on Mar. 14, 2024, which claims the benefit of priority from U.S. patent application Ser. No. 17/948,689 entitled "Media Holder For Sample Preparation," filed on Sep. 20, 2022, which claims the benefit of priority from U.S. Provisional Application No. 63/246,609 entitled "Media Holder For Sample Preparation," filed on Sep. 21, 2021, the contents of which are incorporated herein by reference in their entireties.

STATEMENT OF GOVERNMENT SUPPORT

This invention was made with U.S. Government support under contract 70RSAT18D0000004 task order 70RSAT19FR0000016, awarded by the United States Department of Homeland Security. The Government has certain rights in the invention.

FIELD

This application relates generally to devices and methods for holding sampling media for sample preparation (e.g., positive controls).

BACKGROUND

Contraband Trace Detection (TD) systems can be used to analyse and detect the existence of a particular substance (e.g., an explosive or a substance associated with explosives). Typically, trace systems, use sampling media to collect a material of interest and introduce said material of interest into the TD system for analysis. However, during a test and evaluation event, samples need to be prepared by laboratory staff to ensure assessment requirements are met. One method for sample preparation is known as drop cast crystallization. In this method, a known amount of a contraband material (aliquot) is disposed in a known amount of solvent onto a surface of interest (e.g., swab, substrate or other surface). The aliquot is subsequently allowed to dry and the sample is introduced into the TD system in order to verify the system's functionality (e.g., detecting the positive control) and/or test the system's performance/detection limits (e.g., using test samples). As can be understood, various other test apparatuses, such as chemical, biochemical, and biomedical detectors similarly require samples such as positive controls during development, testing, and calibration phases.

Conventionally, a non-porous surface is used for depositing drop cast crystallized samples. However, when depositing such samples onto porous media, the samples are routinely held by hand, placed onto another surface, or held in an improvised manner until dry. For example, one improvised manner includes a polymer container having an upper rim and coat hanger sections extending thereacross and resting on the upper rim. These conventional approaches for sample preparation on non-porous media can lead to cross contamination, potential movement of the liquid sample prior to drying, and/or movement and/or falling of the sample that can cause contaminated or inaccurately prepared samples, thereby impacting the validity of test events.

SUMMARY

Disclosed herein, in one aspect, is a media holder comprising a base and a pair of walls that extend upwardly from the base. The pair of walls can be elongate along a first axis. The pair of walls can be parallel or generally parallel to each other. Each wall of the pair of walls can define an upper end, an inner surface, and an outer surface. A plurality of transverse members can have respective first and second ends that are spaced along a second axis that is perpendicular to the first axis. Each transverse member of the plurality of transverse members can comprise a top surface, a bottom surface that is spaced from the top surface along a vertical axis that is perpendicular to each of the first and second axes, and respective first and second downwardly extending projections at each end of the first and second ends. The respective first and second downwardly extending projections can be spaced from each other along the second axis. The upper end of a respective wall of the pair of walls can be received between the respective first and second downwardly extending projections. At least one receiving slot can be disposed between the top and bottom surfaces of each of the plurality of transverse members.

Additional advantages of the disclosed appliance and method will be set forth in part in the description which follows, and in part will be understood from the description. The advantages of the disclosed appliance and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatuses and methods and together with the description, serve to explain the principles of the disclosed appliance and method.

DETAILED DESCRIPTION

Figure 1:
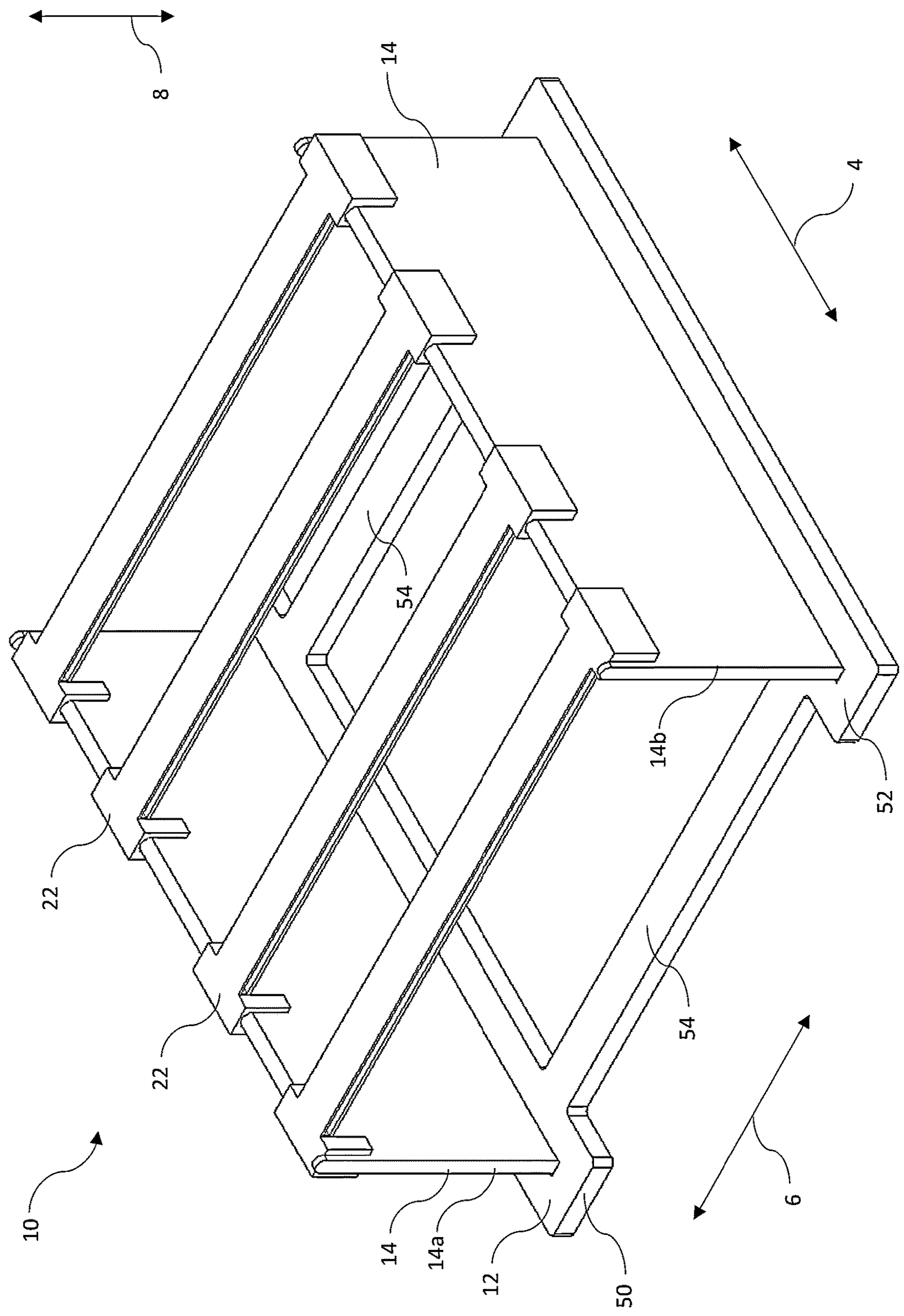
FIG. 1 is a perspective view of a media holder according to an embodiment as disclosed herein.
Figure 2:
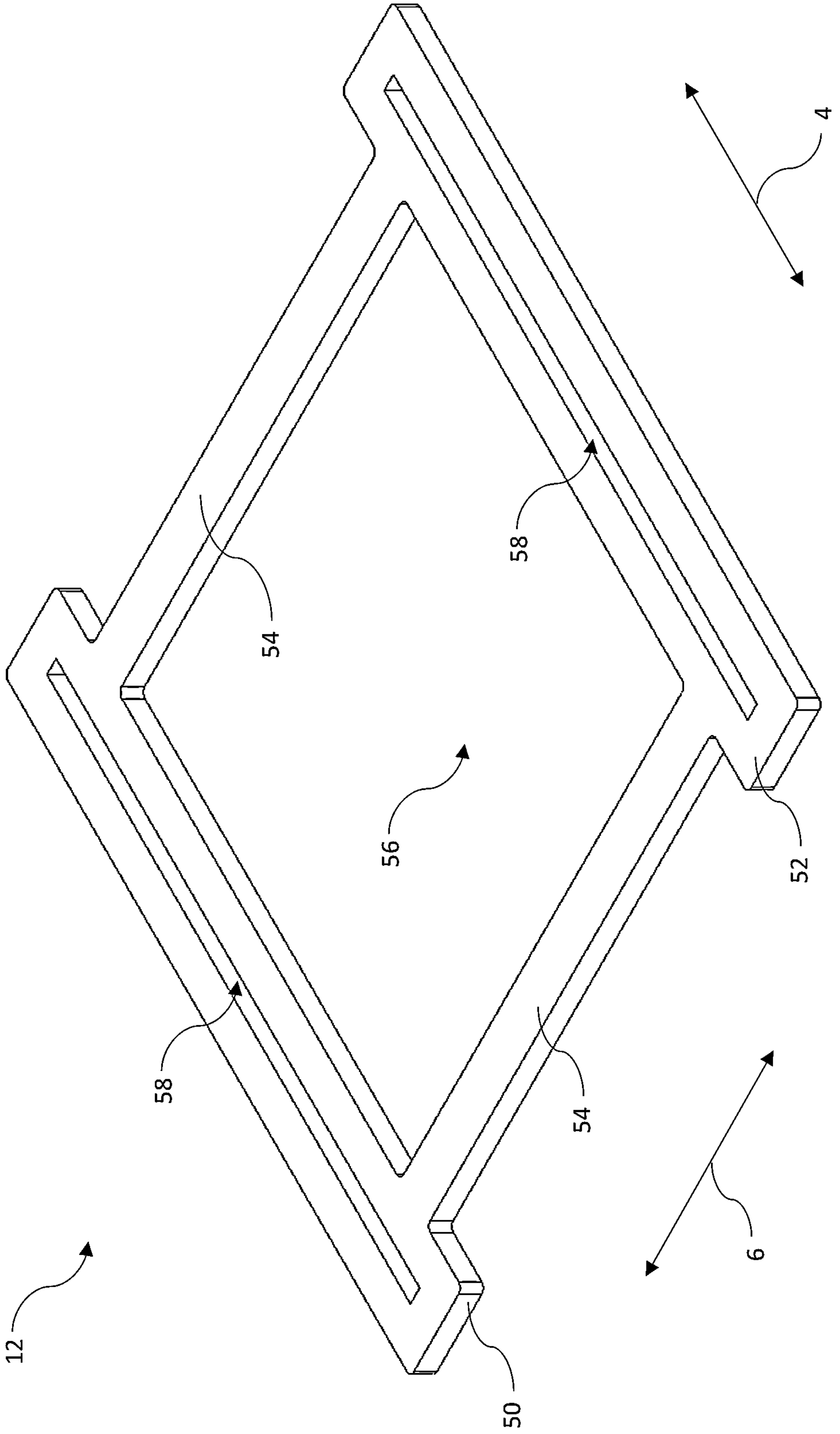
FIG. 2 is a perspective view of a base of the media holder of FIG. 1.
Figure 3:
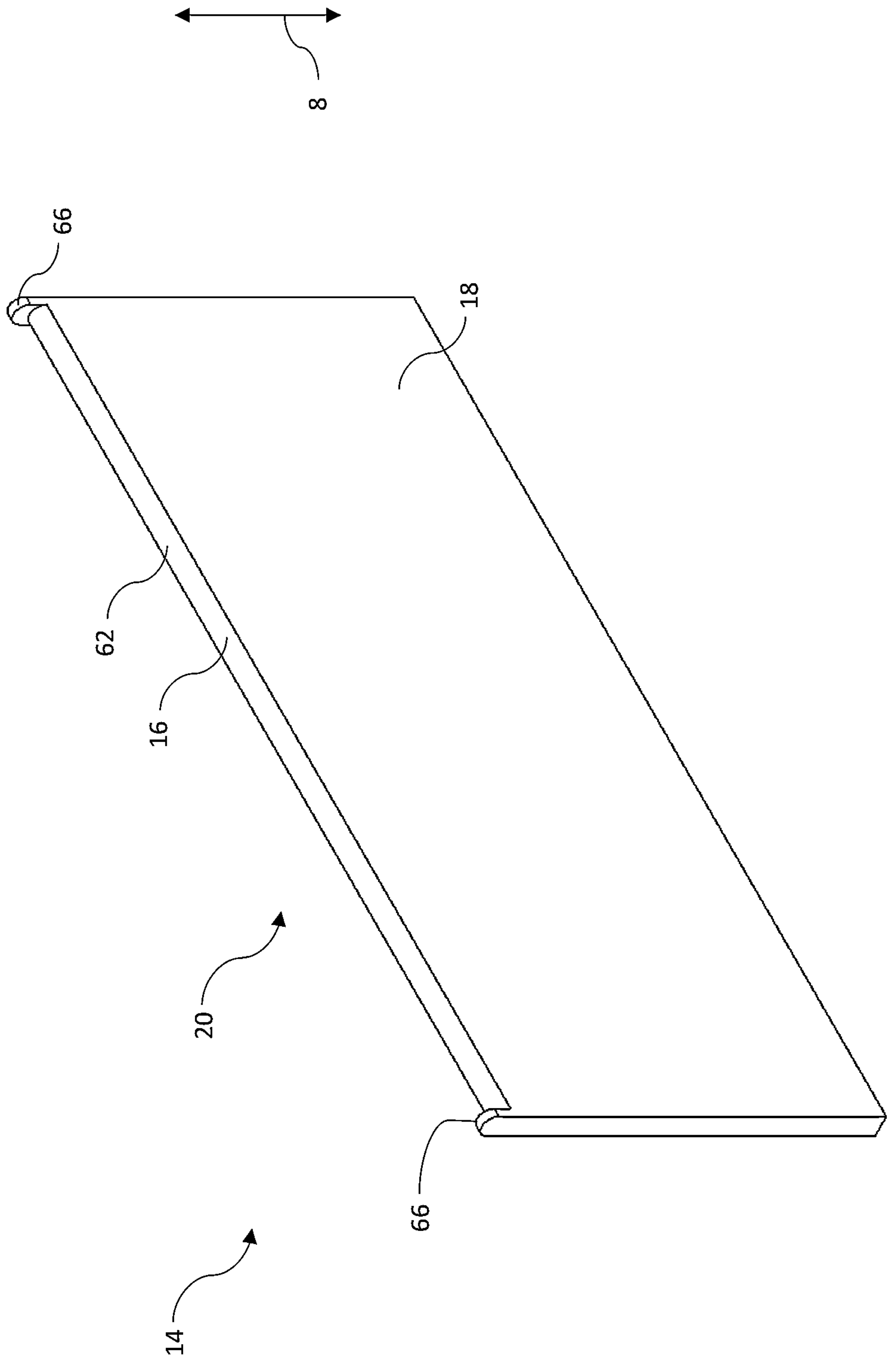
FIG. 3 is a perspective view of a wall of the media holder of FIG. 1.
Figure 4:
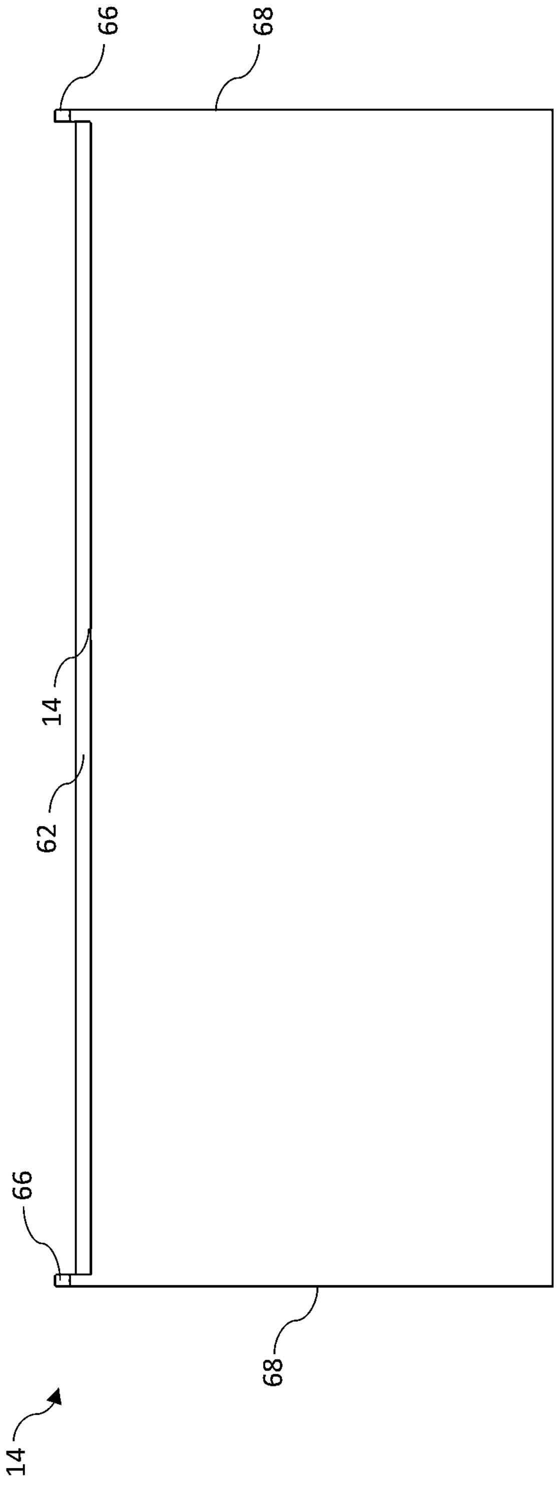
FIG. 4 is a side view of the wall of FIG. 3.
Figure 5:
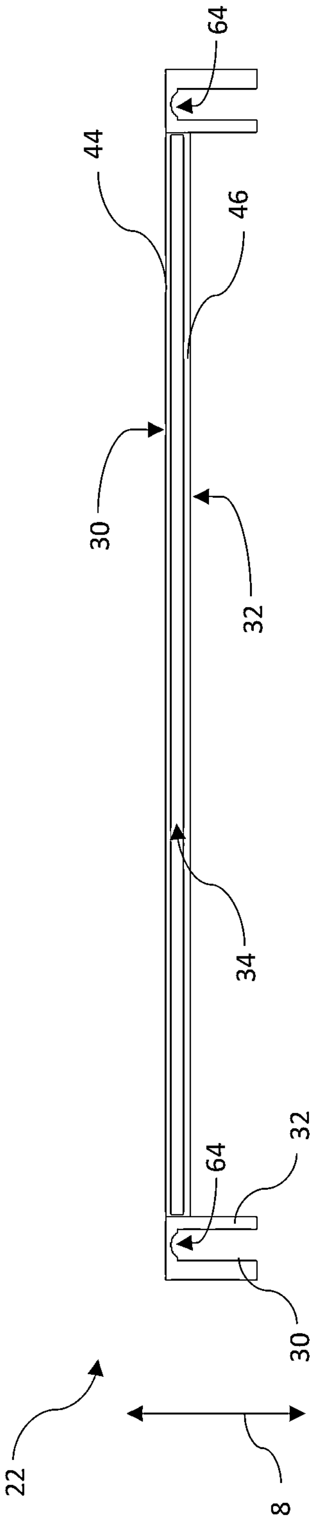
FIG. 5 is a side view of a transverse member of the media holder of FIG. 1.
Figure 6:
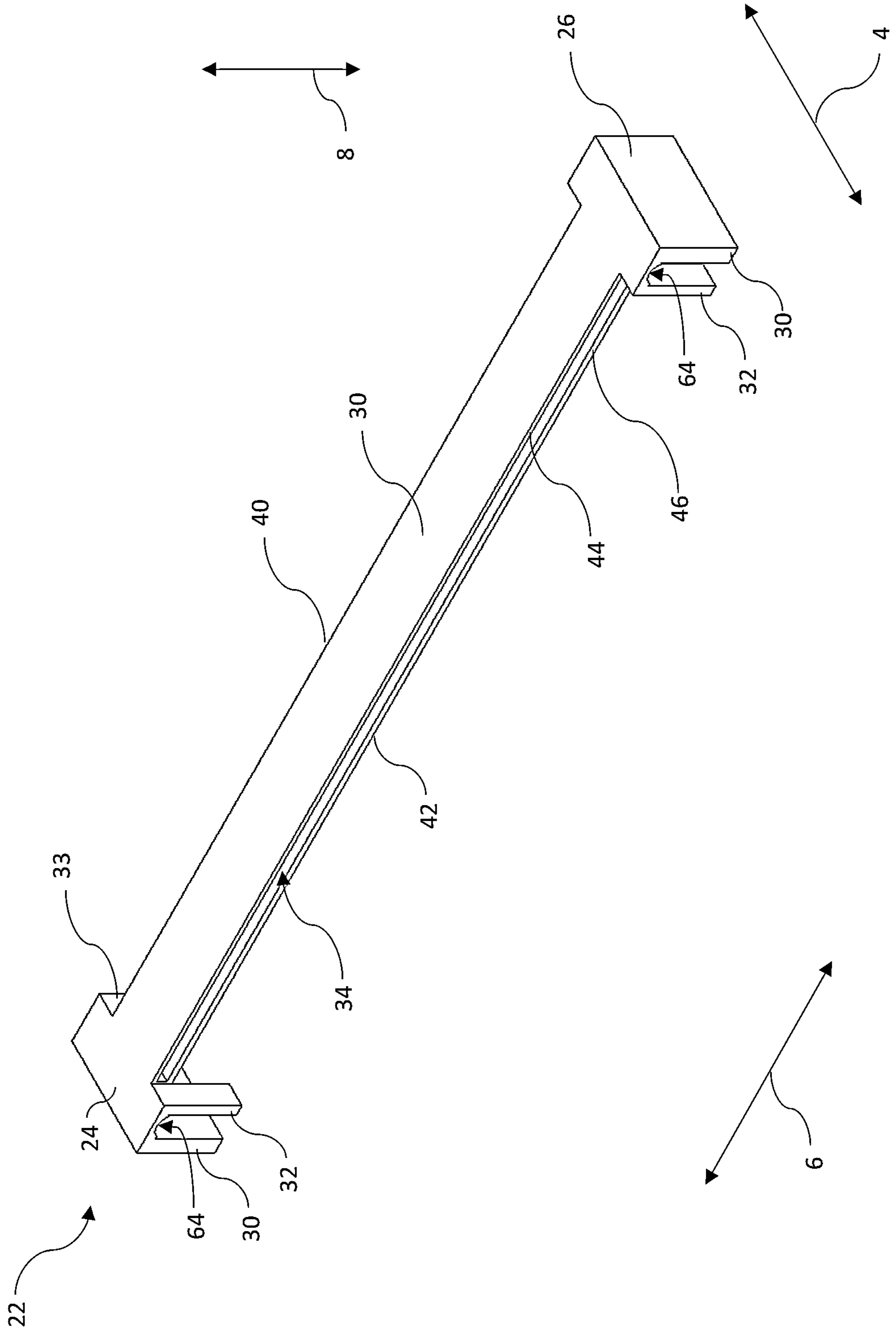
FIG. 6 a perspective view of the transverse member of FIG. 5.

The disclosed apparatuses and methods may be understood more readily by reference to the following detailed description of particular embodiments and the examples included therein and to the Figures and their previous and following description.

A. Definitions

It is to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a transverse member" includes a plurality of such transverse members, and reference to "the transverse member" is a reference to one or more transverse members and equivalents thereof known to those skilled in the art, and so forth. Similarly, a "pair of walls" should be understood to describe an embodiment comprising at least two walls and does not rule out the presence of other walls unless context dictates otherwise.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed appliance and method belong.

Throughout the description and claims of this specification, the word "comprise" and variations of the word, such as "comprising" and "comprises," means "including but not limited to," and is not intended to exclude, for example, other elements, components, integers or steps. In particular, in methods stated as comprising one or more steps or operations, it is specifically contemplated that each step comprises what is listed (unless that step includes a limiting term such as "consisting of"), meaning that each step is not intended to exclude, for example, other elements, components, integers or steps that are not listed in the step.

B. Media Holder

Disclosed herein, in various aspects and with reference to FIGS. 1-8, is a media holder 10 having a first axis 4, a second axis 6 that is perpendicular to the first axis 4, and a vertical axis 8 that is perpendicular to each of the first axis and the second axis. As further described herein, the media holder 10 can hold media that is used to prepare a sample. The media holder 10 can comprise a base 12 and at least a pair walls 14 (e.g., at least two walls) that extend upwardly from the base 12. The walls 14 can be elongate along the first axis 4. The walls 14 can optionally be parallel or generally parallel to each other. Each of the walls 14 can define an upper end 16, an inner surface 18, and an outer surface 20. Optionally, the walls 14 can be solid. In further aspects, the walls 14 can have an open structure or webbed structure to reduce the weight and cost.

A plurality of transverse members 22 can extend between, and couple to, at least two of the walls 14. The plurality of transverse members 22 can each have a first end 24 and a second end 26 that are spaced along the second axis 6. The plurality of transverse members 22 can comprise a top surface 30 and a bottom surface 32 that is spaced from the top surface along the vertical axis 8.

The first and second ends 24, 26 of the plurality of transverse members 22 can be configured to couple to the upper end 16 of a wall 14. For example, each of the transverse members 22 can comprise, at each of the first and second ends 24, 26, first and second downwardly expending projections 30, 32 that are spaced along the second axis 6. The upper end 16 of the wall 14 can be received between the first and second downwardly extending projections. Each of the transverse members 22 can comprise at least one receiving slot 34 disposed between the top and bottom surfaces 30, 32.

In some aspects, the walls 14 can each have a thickness between the inner and outer surfaces 18, 20, and the first and second downwardly extending projections 30, 32 can be spaced from each other along the second axis 6 to provide an interference fit (e.g., a press fit) between the wall and the first and second downwardly extending projections 30, 32. The interference fit can be selected from or range from a tight interference fit that does not allow any sliding along the wall to a loose interference that allows sliding with application of sufficient pressure. In further optional aspects, the first and second downwardly extending projections 30, 32 can be spaced from each other along the second axis 6 to provide a sliding fit (e.g., enabling easy sliding of the transverse member 22 along the wall 14).

In some aspects, the transverse members 22 can comprise, at each of the first and second ends 24, 26, a third downwardly extending projection 33 that is spaced from the second projection 32 along the second axis 6. The third downwardly extending projection 33 can similarly be spaced from the first downwardly extending projection 30 to define an interference fit therebetween.

In some aspects, each transverse member 22 can have a width between a first side 40 and a second side 42 that are spaced along the first axis 4. In some optional aspects, the transverse members 22 can define at least one receiving slot 34 that extends continuously through said transverse member from the first side 40 to the second side 42. Optionally, the transverse member 22 can define a single receiving slot 34 that extends continuously along at least 40%, at least 60%, at least 80% or at least 90% of the length of the transverse members (along the second axis 6). In further optional aspects, the transverse member 22 can define a plurality of receiving slots 34 spaced longitudinally along the second axis.

Figure 7:
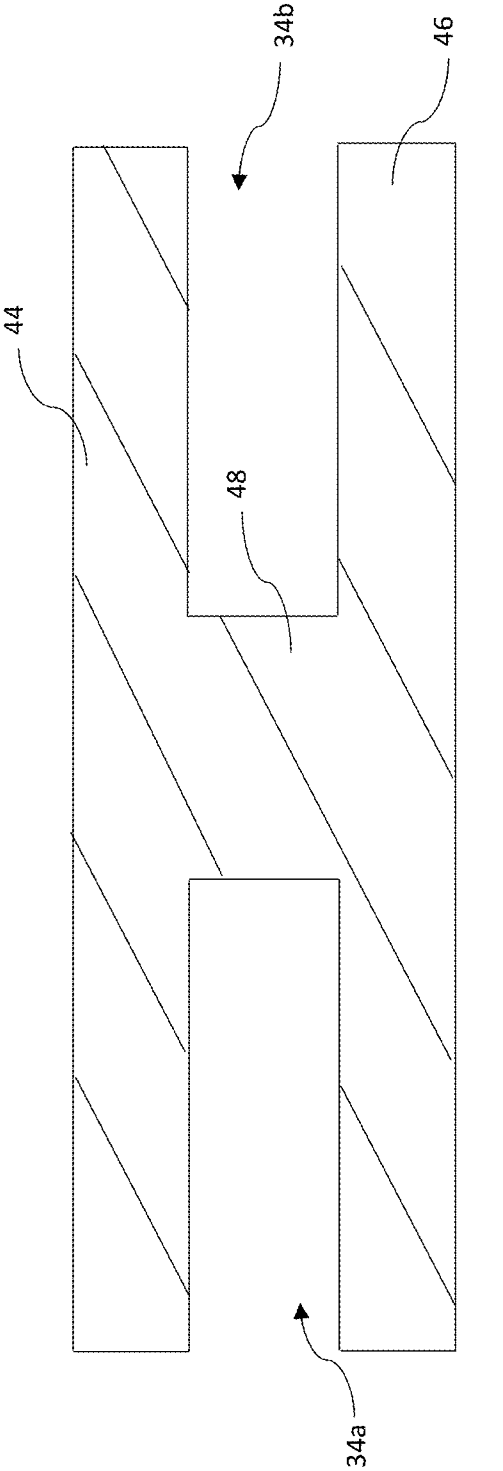
FIG. 7 is a cross sectional view of the transverse member in a plane that is perpendicular to the length of the transverse member.

In still further aspects, with reference to FIG. 7, which shows a cross sectional view of a transverse member 22 in a plane that is perpendicular to the second axis 6, a first receiving slot **34*a* can extend inwardly from the first side 40 through only a portion of the width of said transverse member and a second receiving slot 34*b* can extend inwardly from the second side 42 through only a portion of the width of said transverse member. In further optional aspects, the transverse member 22 can define a plurality of receiving slots 34 spaced longitudinally along the second axis 6 on each of the first and second sides 40, 42 of the transverse member 22**.

In some aspects, the transverse member 22 can have a top portion 44 that defines the top surface 30 and a bottom portion 46 that defines the bottom surface 32. The top and bottom portions 44, 46 can cooperate to define the one or more receiving slots 34 therebetween. A web 48 can extend between the top portion 44 and the bottom portion 46 to divide the first receiving slot **34*a* from the second receiving slot 34*b***.

Optionally, the transverse members 22 can be configured to couple to, or rest upon, a third wall (not shown) that is positioned between two walls 14. Said third wall can provide added structural support to accommodate different sizes and weights of sample media. In these aspects, it is contemplated that the transverse member 22 can comprise projections that are configured to receive (e.g., via interference fit) the third wall. In further aspects, the transverse members 22 can rest upon the third wall. In yet further aspects, four or more walls are contemplated.

Figure 9:
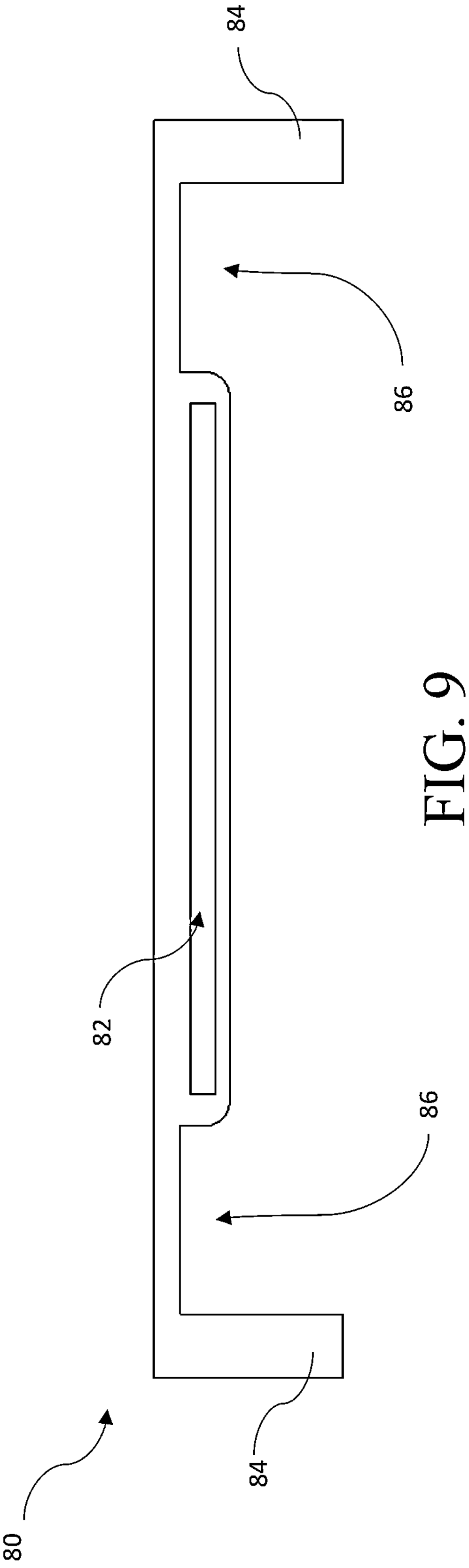
FIG. 9 a side view of a cross member according to an embodiment as disclosed herein.
Figure 10:
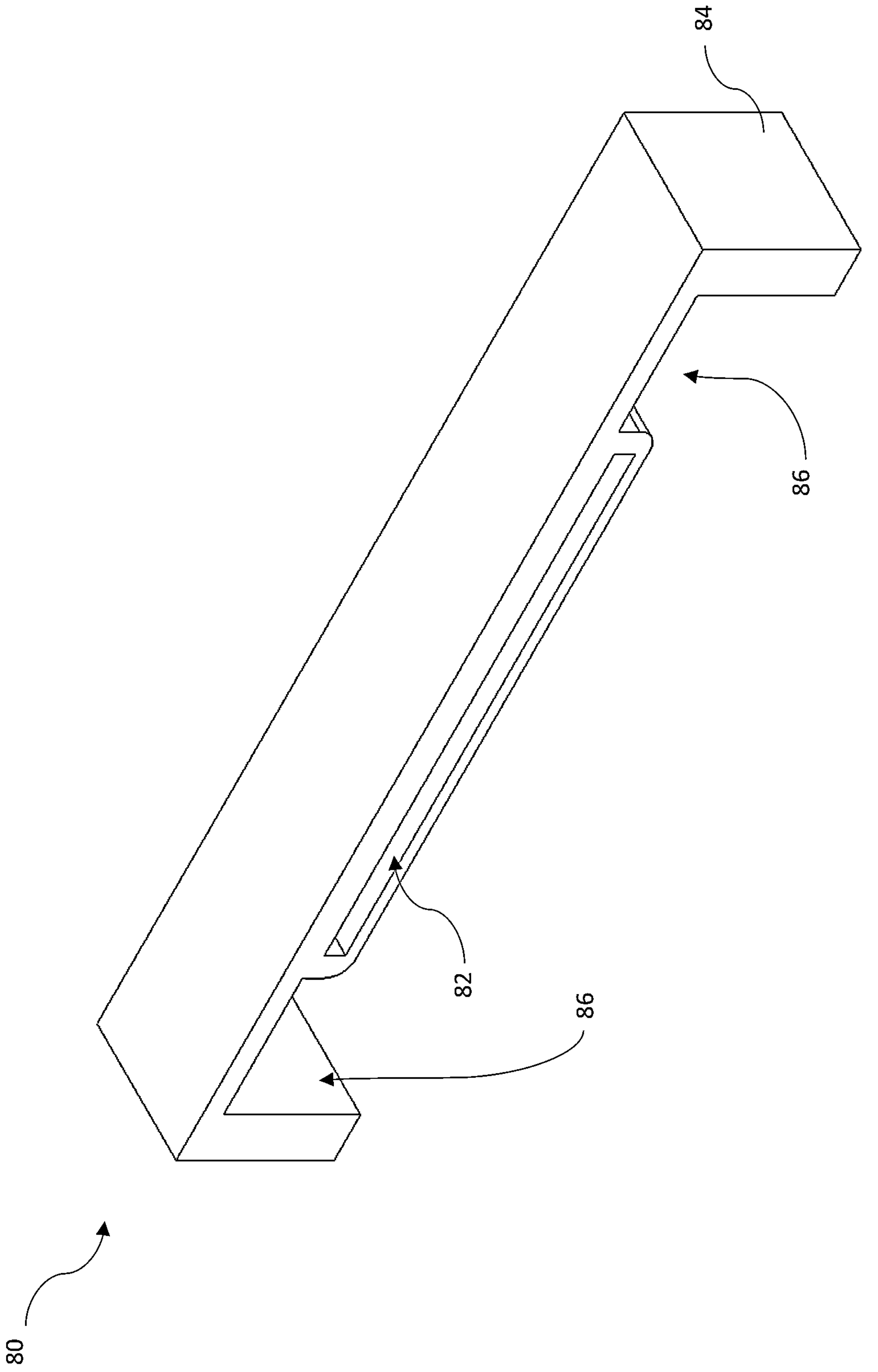
FIG. 10 is a perspective view of the cross member of FIG. 9.
Figure 11:
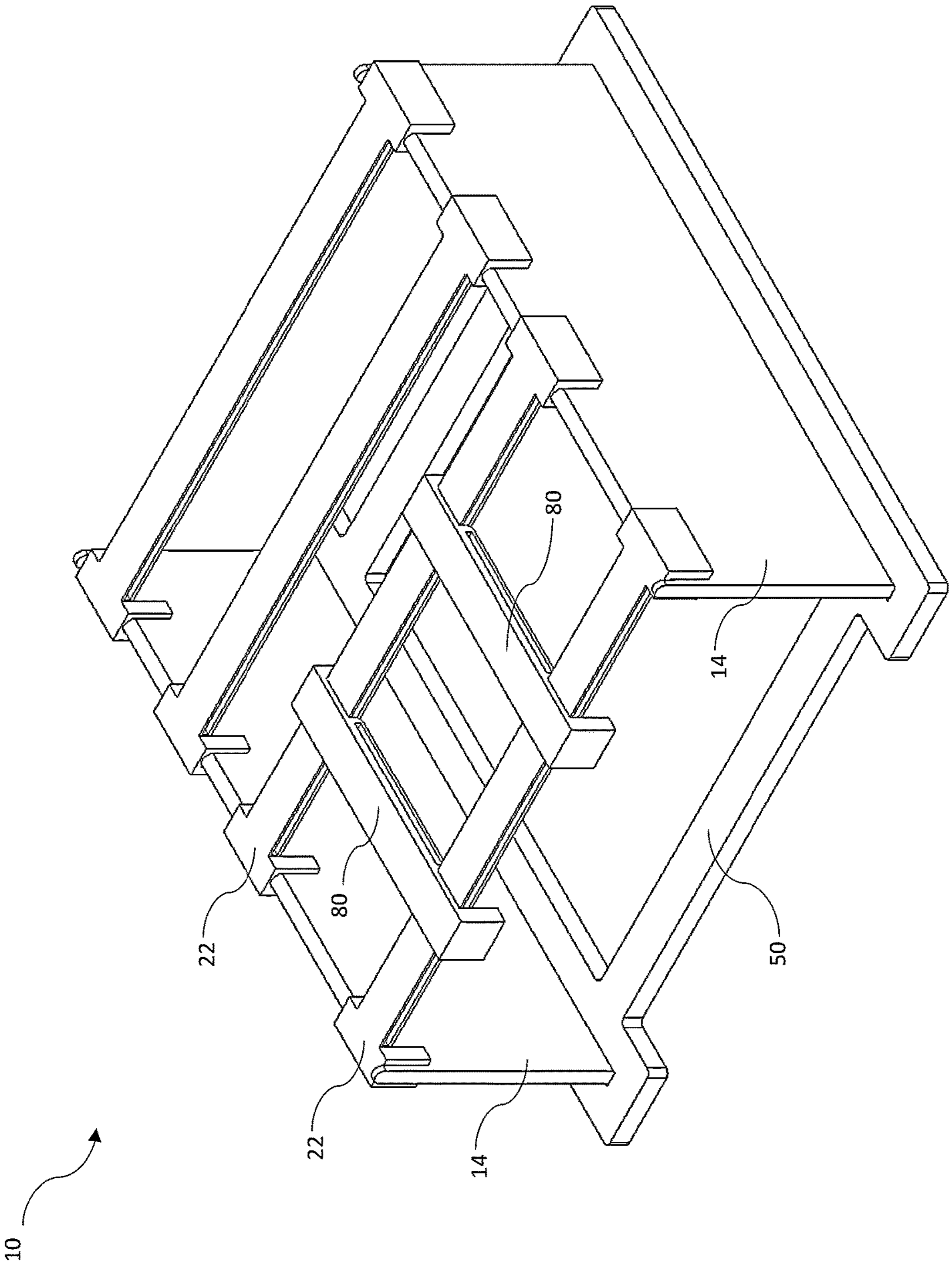
FIG. 11 is a perspective view of a media holder according to another embodiment comprising cross members as in FIG. 9.

Referring also to FIGS. 9-11, in some aspects, the media holder 10 can comprise one or more cross members 80 that extend between and rest upon transverse members 22. Each of the cross members 80 can define at least one receiving slot 82 that is configured to receive sample media. For example, the cross members 80 can have the same cross section as illustrated in FIG. 7, defining receiving slots 82 that extend inwardly from each side. Each cross member 80 can define slots 86 to receive at least upper portions of the transverse members upon which the cross member rests. The slots can have a width (along the length of the cross member) that are about equal to the width of the transverse members 22. For example, the slots 86 can define an interference fit with or a sliding fit (with limited play along the length of the cross member 80) with the transverse members 22. In some aspects, the cross member 80 can comprise downwardly extending tabs 84 that extend downwardly past outer sides of the transverse members 22 upon which the cross member 80 rests.

In some aspects, the base 12 can comprise a first portion 50 that couples to a first wall **14*a* of the pair of walls 14 and a second portion 52 that couples to a second wall 14*b* of the pair of walls. One or more transverse portions 54 can extend between and couple to the first and second portions 50, 52. In some aspects, at least two transverse portions 54 (optionally, exactly two transverse portions) can extend between the first and second portions 50, 52 to define an opening 56 therebetween. It is contemplated that this opening 56** can minimize material use and, thus, weight and cost.

In some aspects, the base 12 can define receptacles 58 (optionally, a pair of receptacles, e.g., slots) that can receive a respective lower end 60 of each wall 14. For example, the lower ends 60 of the walls 14 can be press-fit into respective receptacles 58 (e.g., slots) to thereby couple the walls to the base 12. This configuration can enable the base 12 and walls 14 to be assembled and disassembled, thereby enabling the media holder 10 to be flat-packed. Optionally, the first and second portions 50, 52 can each define a respective slot. In various further aspects, the base 12 can define other receptacles 58, such as a plurality of slots or holes spaced along the first axis 4 that receive respective tabs or pins of the lower ends 60 of the walls 14. In further optional aspects, the base 12 and walls 14 can be integrally formed. In yet further aspects, the base 12 and walls 14 can be coupled in any suitable permanent or non-permanent coupling, including use of brackets, fasteners, adhesives, combinations thereof, and the like. It is further contemplated that the base 12 can be embodied in various other ways. For example, the base 12 can comprise multiple separate components (e.g., first and second portions 50, 52 that are not coupled by transverse portions 54). Still further, the base 12 can be configured to support three or more walls 14. Accordingly, it is contemplated that the base 12 is configured to support at least two walls, and the base can be a unitary component or a plurality of components that are coupled together or remain separate and uncoupled.

In some aspects, the upper end 16 of the wall 14 can define a convex surface 62. In some aspects, each end of the pair of walls can define a complementary concave surface 64 between the first and second downwardly extending projections 32 of the transverse members 22 on each side. It is contemplated that this complementary surface can enable easy sliding of the transverse members 22 along the walls 14 to facilitate positioning of the transverse members relative to each other along the first axis 4 for receiving media. In some optional aspects, the upper ends 16 of the walls 14 can be notched to retain the transverse members 22 in discrete positions along the lengths of the walls. Optionally, the transverse members 22 can define complementary features that are receivable into the notches of the upper end of the walls 14.

In some aspects, the walls 14 can have opposed longitudinal ends 68. The walls 14 can define a stop 66 (e.g., a tab that extends above the upper end of the wall) at the longitudinal ends 68. In further aspects, the stop 66 can extend laterally from one or both of the first and second sides 18, 20 of the wall 14 along the second axis 6. The stop 66 can inhibit the transverse members from sliding off the longitudinal ends 68.

In some optional aspects, the media holder 10 can comprise two, three, four, five, six, or more transverse members 22.

In various aspects, at least a portion (optionally, all) of the media holder 10 (e.g., the base 12, walls 14, and transverse members 22) can comprise polymer (e.g., optionally, acrylonitrile butadiene styrene (ABS)). In this way, the media holder 10 can be disposable or recyclable, for example, if contaminated. In some aspects, the media holder 10, or some components thereof, can be three-dimensionally (3D) printed. In further aspects, one or more components of the sample preparation holder 10 (e.g., the base 12, walls 14, and transverse members 22) can be fabricated or machined from a material such as metal (e.g., steel, stainless steel, aluminum or aluminum alloy such as aluminum 6061) to allow for it to be decontaminated (e.g., cleanable via solvent wash and/or baking in an oven). Such reuse after decontamination can reduce costs in the event of a contamination event.

Optionally, an assembly can comprise one or more transverse members 22 that couple multiple bases 12. For example, two bases 12 as illustrated can each support respective pairs of walls 14. The bases 12 and pairs of walls 14 can be positioned adjacently so that one or more transverse members 22 can extend between the adjacent walls. Thus, in some aspects, two media holders 10 as shown in FIG. 1 can be coupled together by one or more transverse members 22. In this way, the assembly can be expanded to hold more media and/or larger media.

Optionally, the media holder 10 can be placed on a covered and/or wipeable/cleanable surface to prevent contamination of the surface below in the event a surface or a spill occurs and/or within a larger container to minimize drafts during sample deposition or solvent evaporation.

Optionally, the media holder 10 can be designed in a manner such that it can be placed within an environmental chamber or nitrogen dry box to facilitate sample evaporation and storage of the samples.

Optionally, the base 12 and walls 14 are not configured for disassembly. Optionally, the media holder 10 can comprise a hook or hanger to enable easy storage thereof.

Optionally, the base 12 can be omitted, and the walls 14 can be balanced with support from transverse members 22.

Figure 12:
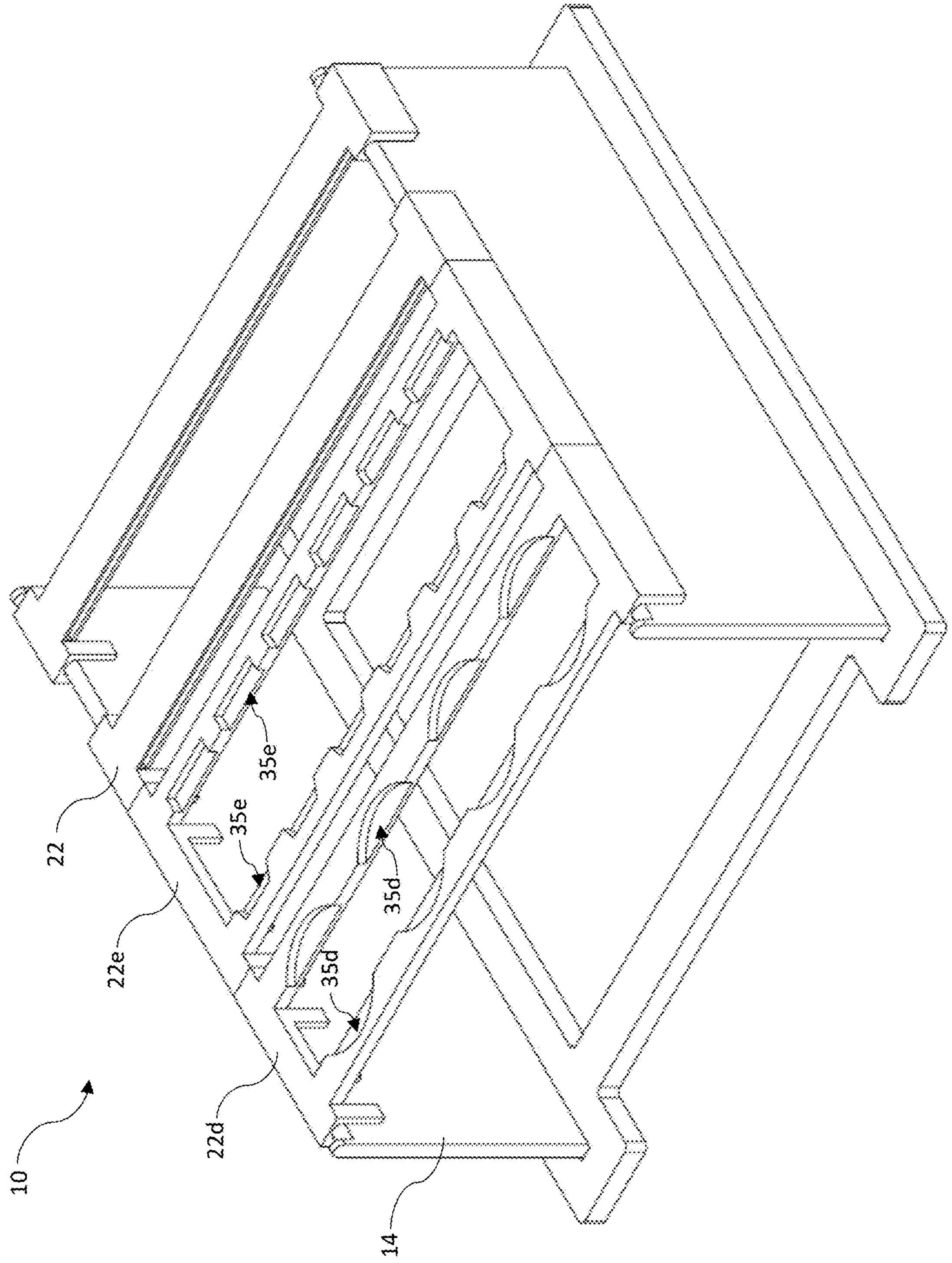
FIG. 12 is a perspective view of a media holder according to another embodiment as disclosed herein.
Figure 13:
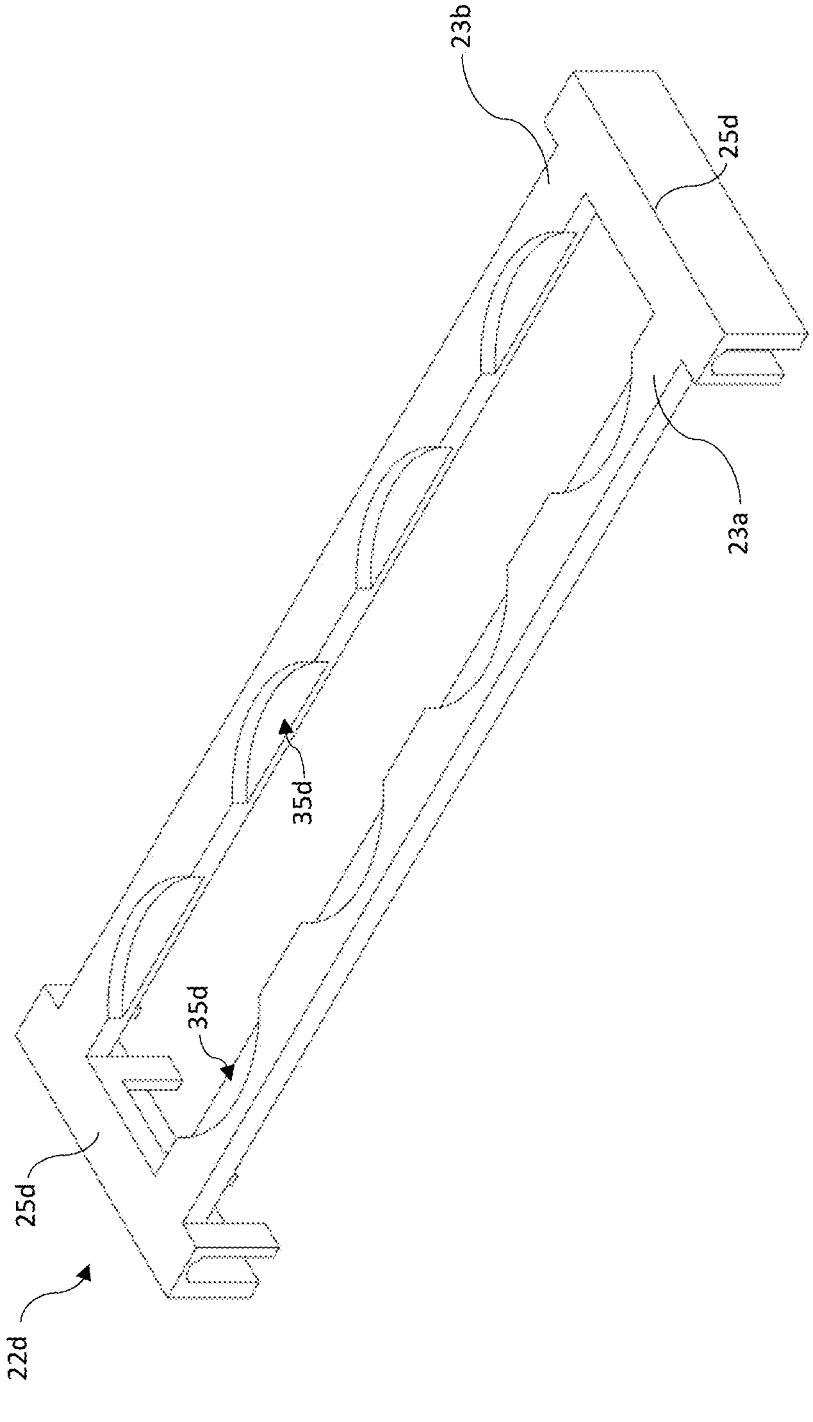
FIG. 13 is a perspective view of a transverse member according to an embodiment as in FIG. 12.
Figure 14:
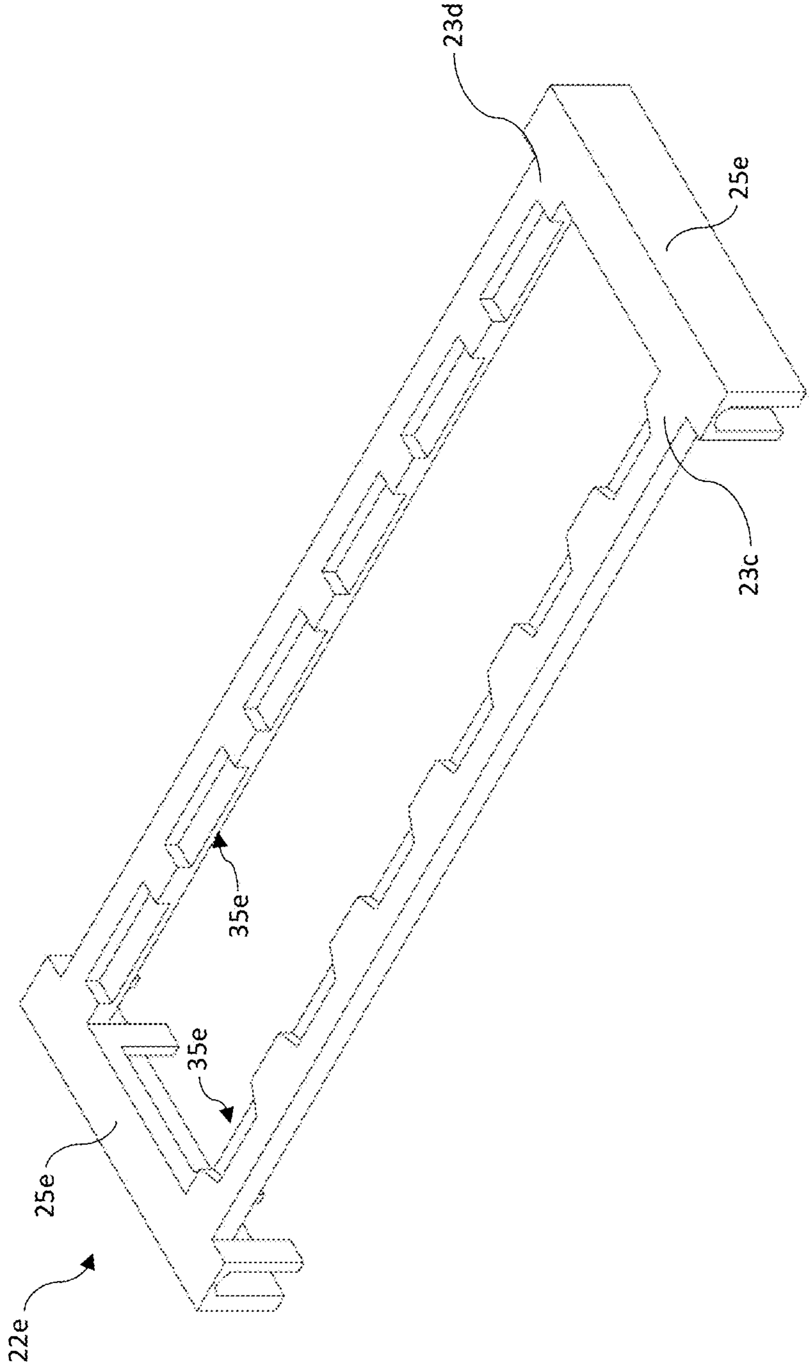
FIG. 14 is a perspective view of a transverse member according to an embodiment as in FIG. 12.

Referring to FIGS. 12-14, in some aspects, the transverse member 22 of the media holder 10 can comprise one or more transverse members 22*e* and 22*d*, that include cutouts 35*d* and 35*e*. Each of the transverse members 22*e*, 22*d* can define at least one cutout 35*d*, 35*e* that is configured to receive sample media. For example, the transverse members 22*e* and 22*d* can have cutouts 35*d* of the same shape, illustrated as circular cutouts. The transverse members 22*e* and 22*d* can have cutouts 35*e* of different shapes, illustrated as trapezoidal cutouts or rectangular cutouts. Such cutouts can be shaped to correspond to features of the sample media, and can be based on other shapes for the cutouts or sampling media such as ovals, stars, triangles, diamonds, parallelograms, and so on. The transverse members 22*e*, 22*d* can be slidably repositioned on the walls 14 of the media holder 10.

FIG. 13 is a perspective view of the transverse member 22*d* according to an embodiment as in FIG. 12. The transverse member 22*d* includes a plurality of sub-members 23*a*, 23*b*. The transverse member 22*d* includes cutouts 35*d* that are curved. The cutouts 35*d* on opposing sub-members 23*a*, 23*b* are spaced apart such that the corresponding opposing cutouts 35*d* together define a circular composite cutout. Accordingly, the opposing cutouts 35*d* together can receive a circular-shaped sample media. The transverse member 22*d* includes coupling members 25*d* to couple the plurality of sub-members 23*a*, 23*b* to each other. In other embodiments, the coupling members 25*d* can be of shorter or longer lengths, to accommodate larger or smaller sizes of sampling media. In an embodiment, the coupling members 25*d* are used to couple additional sub-members to the transverse member 22*d*. The illustrated embodiment accommodates four composite cutouts along the transverse member. In other embodiments, a greater or fewer number of composite cutouts can be accommodated (e.g., the embodiment of FIG. 14 includes six composite cutouts). The composite cutouts enable a media sample to be placed so that it is supported by cutouts from both of the sub-members 23*a*, 23*b*.

FIG. 14 is a perspective view of the transverse member 22*e* according to an embodiment as in FIG. 12. The transverse member 22*e* includes a plurality of sub-members 23*c*, 23*d*. The transverse member 22*e* includes cutouts 35*e* that are rectangular or trapezoidal. The cutouts 35*e* on opposing sub-members 23*c*, 23*d* are spaced apart such that the corresponding opposing cutouts 35*d* together define an angular composite cutout including a tapered end and a square end. Accordingly, the opposing cutouts 35*e* together can receive an angular-shaped sample media. Other shapes of the cutouts 35*e* can allow for correspondingly differently shaped media samples. The transverse member 22*e* includes coupling members 25*e* to couple the plurality of sub-members 23*c*, 23*d* to each other. In other embodiments, the coupling members 25*e* can be of shorter or longer lengths, to accommodate larger or smaller sizes of sampling media. In an embodiment, the coupling members 25*e* are used to couple additional sub-members to the transverse member 22*e*. The illustrated embodiment accommodates six composite cutouts along the transverse member. In other embodiments, a greater or fewer number of composite cutouts can be accommodated (e.g., the embodiment of FIG. 13 includes four composite cutouts). The composite cutouts enable a media sample to be placed so that it is supported by cutouts from both of the sub-members 23*c*, 23*d*.

C. Methods of Using the Media Holder

The media holder 10 can be assembled by inserting the lower end 60 of the wall 14 into the respective receptacle(s) 58. The transverse members 22 can be positioned on the walls. For example, the upper end 16 of each wall 14 of the pair of walls can be positioned between the respective first and second downwardly extending projections 30, 32 at the respective first or second ends 24, 26 of each transverse member 22 (e.g., a first transverse member 22*a* and a second transverse member 22*b*).

Similarly, to dismantle the media holder 10, the upper end 16 of each wall 14 can be removed from between each of the first and second downwardly extending projections 30, 32 of the transverse members 14 at the respective end. For example, the transverse members 22 can be lifted vertically from the walls 14. The walls can then be removed from the receptacles 58 of the base 12.

Figure 8:
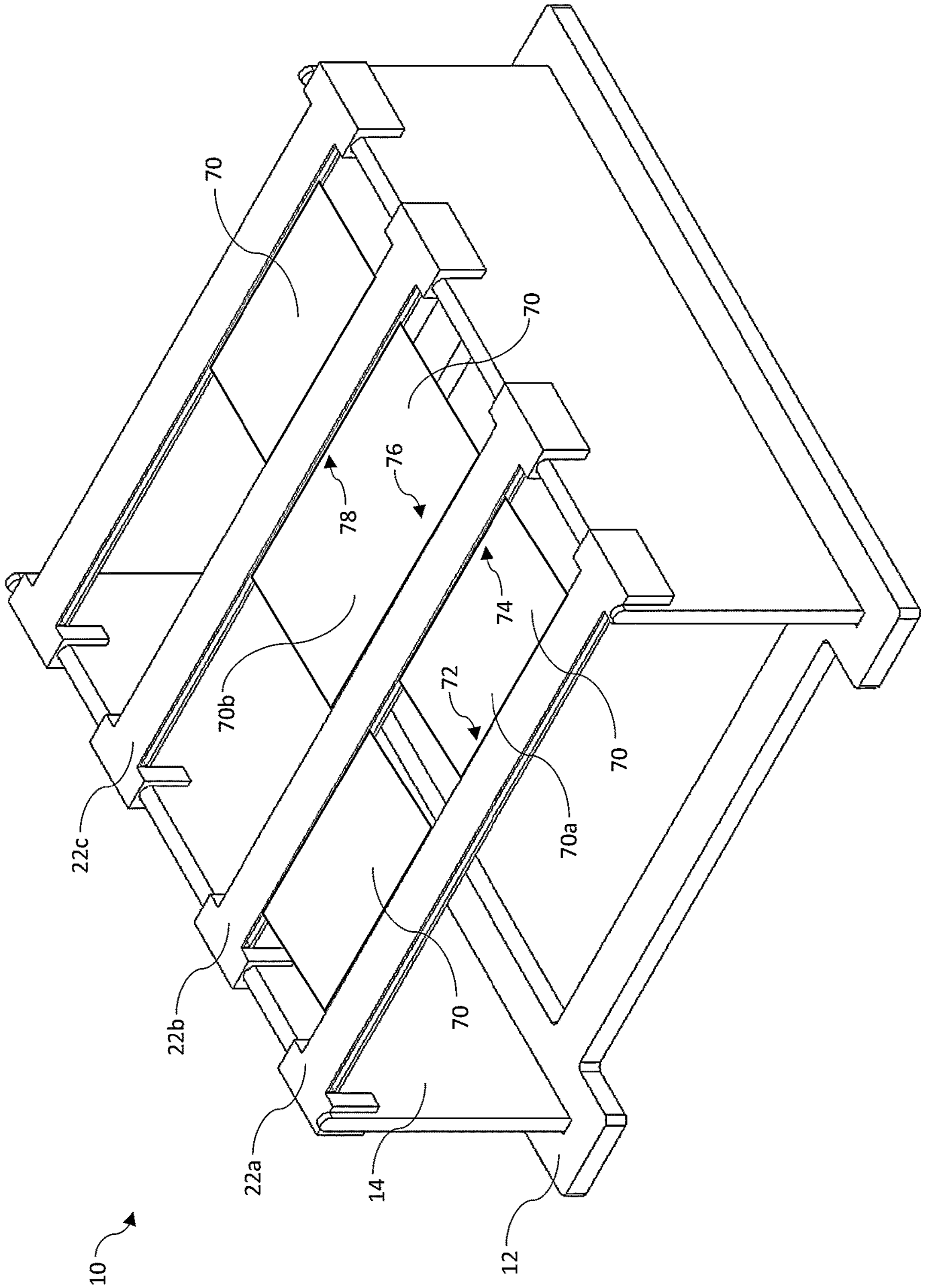
FIG. 8 is a perspective view of the media holder of FIG. 1 having media thereon.

Referring to FIG. 8, one or a plurality of media 70 can be positioned onto the media holder 10 for application/deposition of a sample (e.g., a substance of interest). A first end 72 of a first media 70*a* can be inserted into a receiving slot 34 of a first transverse member 22*a*, and a second end 74 can be inserted into a receiving slot 34 of a second transverse member 22*b*. The media 70 can comprise, for example, polytetrafluoroethylene (PTFE)-coated fiberglass, flame-resistant materials (e.g., meta-aramid materials such as NOMEX material provided by DUPONT), or any other suitable media. Optionally, the media 70 can be embodied as, for example, a swipe pad or a filter. In further aspects, the media 70 can comprise any structure that defines a surface for depositing a sample. Thus, the media 70 can optionally comprise, for example, PTFE, glass, metal, or any other suitable material that serves its intended purpose (e.g., receiving a deposited sample). In various applications, it is contemplated that different sizes and shapes (e.g., rectangular, circular or round, flat, uneven, amorphous, etc.) of media can be used. The media holder 10 can be configured, adapted, or customized to accommodate different media (optionally, accommodating different media at the same time). For example, the dimensions of the transverse members 22 and receiving slots 34 can be selected based on media thickness and other dimensions.

Optionally, the first transverse member 22*a* can be moved relative to the second transverse member 22*b* along the first axis 4 to select the spacing between the first and second transverse members 22*a, b*. In this way, the media holder 10 can be adapted for differently sized media. In some aspects, a first end 76 of a second media 70*b* can be inserted into a receiving slot 34 of the second transverse member 22*b*, and a second end 78 of the second media 70*b* can be inserted into a receiving slot of the third transverse member 22*c*.

In some optional aspects, a third transverse member 22*c* can be positioned relative to the second transverse member 22*b* so that a spacing between the first and second transverse members 22*a,b* along the first axis 4 is different than a spacing between the second and third transverse members 22*b,c* along the first axis. In this way, differently sized media can be positioned on the same media holder 10 at one time.

A sample substance can be applied (e.g., deposited) onto the media 70 while the media is supported by the media holder 10. Optionally, the sample can comprise a chemical substance such as, for example, and explosive, opioid, drug, chemical agent, etc. Exemplary deposition methods include drop cast crystallization, aerosol deposition, etc. Optionally, the sample substance on the media can serve as a control sample.

Advantages of the disclosed apparatuses and methods include the ability to hold media to inhibit cross contamination (e.g., due to the media falling during sample deposition or drying). Thus, testing efficiency can be improved by eliminating wasted samples that fall during preparation and become contaminated. Further, the apparatus can be adjustable for use with different media types.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An apparatus comprising:

- a base;
- a pair of walls that extend upwardly from the base, wherein the pair of walls are elongate along a first axis, wherein the pair of walls are parallel or generally parallel to each other, wherein each wall of the pair of walls defines an upper end, an inner surface, and an outer surface;
- a plurality of transverse members having respective first and second ends that are spaced along a second axis that is perpendicular to the first axis, wherein each transverse member of the plurality of transverse members comprises:
- a top surface;
- a bottom surface that is spaced from the top surface along a vertical axis that is perpendicular to each of the first and second axes;
- respective first and second downwardly extending projections at each end of the first and second ends, wherein the respective first and second downwardly extending projections are spaced from each other along the second axis, wherein the upper end of a respective wall of the pair of walls is received between the respective first and second downwardly extending projections; and
- at least one receiving slot disposed between the top and bottom surfaces.

Aspect 2: The apparatus of aspect 1, wherein each transverse member of the plurality of transverse members has a width between a first side and a second side that are spaced along the first axis, wherein at least one receiving slot extends continuously through said transverse member from the first side to the second side.

Aspect 3: The apparatus of aspect 1 or aspect 2, wherein each transverse member of the plurality of transverse members has a width between a first side and a second side that are spaced along the first axis, wherein the at least one receiving slot comprises:

- a first receiving slot that extends inwardly from the first side through only a portion of the width of said transverse member; and
- a second receiving slot that extends inwardly from the second side through only a portion of the width of said transverse member.

Aspect 4: The apparatus of any one of the preceding aspects, wherein each wall has a respective thickness between the inner surface and the outer surface of the wall, wherein the first and second downwardly extending projections are spaced from each other along the second axis according to an interference fit with the respective wall so that the first and second downwardly extending projections respectively bias against the inner and outer surfaces of the respective wall.

Aspect 5: The apparatus of any one of the preceding aspects, wherein each transverse member of the plurality of transverse members comprises, at each of the first and second ends, a third downwardly extending projection that is spaced from the second downwardly extending member along the first axis.

Aspect 6: The apparatus of any one of the preceding aspects, wherein each wall has opposing first and second longitudinal ends that are spaced along the first axis, wherein each wall of the pair of walls defines a respective stop at each of the first and second longitudinal ends, wherein each of the stops at the first and second longitudinal ends of each wall inhibits a transversely extending member of the plurality of transversely extending members from sliding past said stop.

Aspect 7: The apparatus of any one of the preceding aspects, wherein each transverse member of the plurality of transverse members comprises a top portion that defines the top surface and a bottom portion that defines the bottom surface, wherein the top portion and bottom portion cooperate to define the at least one receiving slot therebetween.

Aspect 8: The apparatus of aspect 7, wherein each transverse member of the plurality of transverse members has a width between a first side and a second side that are spaced along the first axis, wherein the at least one receiving slot comprises:

- a first receiving slot that extends inwardly from the first side through only a portion of the width of said transverse member; and a second receiving slot that extends inwardly from the second side through only a portion of the width of said transverse member, wherein each transverse member comprises a web that extends between the top portion and bottom portion, wherein the web divides the first receiving slot from the second receiving slot.

Aspect 9: The apparatus of any one of the preceding aspects, wherein the base comprises:

a first portion that couples to a first wall of the pair of walls;

a second portion that couples to a second wall of the pair of walls; and at least one transverse portion that extends between, and couples to the first portion and the second portion.

Aspect 10: The apparatus of any one of the preceding aspects, wherein each wall of the pair of walls has a lower end that is spaced from the upper end along the vertical axis, wherein the base defines a respective receptacle that receives the lower end of each wall with an interference fit.

Aspect 11: The apparatus of any one of the preceding aspects, wherein the walls are integrally formed with the base.

Aspect 12: The apparatus of any one of the preceding aspects, wherein the upper end of each wall of the pair of walls defines a convex surface.

Aspect 13: The apparatus of any one of the preceding aspects, wherein the plurality of transverse members comprise at least three transverse members.

Aspect 14: A method of using the apparatus as in any one of the preceding aspects, the method comprising:

inserting a first end of a media into the at least one receiving slot of a first transverse member of the plurality of transverse members; and inserting an opposing second end of the media into the at least one receiving slot of a second transverse member of the plurality of transverse members.

Aspect 15: The method of aspect 14, further comprising:

moving the first transverse member relative to the second transverse member along the first axis.

Aspect 16: The method of aspect 14 or aspect 15, wherein the sampling media comprises PTFE-coated fiberglass or a flame-resistant material.

Aspect 17: The method of any one of aspects 14-16, further comprising applying a sample onto the media.

Aspect 18: The method of any one of aspects 14-17, wherein the media is a first media of a first type, the method further comprising:

inserting a first end of a second media into the at least one receiving slot of the second transverse member of the plurality of transverse members; and inserting an opposing second end of the second media into the at least one receiving slot of a third transverse member of the plurality of transverse members, wherein the second media is a second type of media that is different than the first type.

Aspect 19: The method of aspect 18, wherein a spacing between the first and second transverse members along the first axis is different than a spacing between the second and third transverse members along the first axis.

Aspect 20: The method of any one of aspects 14-19, wherein each wall of the pair of walls has a lower end that is spaced from the upper end along the vertical axis, wherein the base defines a respective receptacle that receives the lower end of each wall with an interference fit, the method further comprising:

inserting the lower end of each wall of the pair of walls into the respective receptacle of the base;

positioning the upper end of each wall of the pair of walls between the respective first and second downwardly extending projections at the respective end of the first and second ends of the first transverse member;

positioning the upper end of each wall of the pair of walls between the respective first and second downwardly extending projections at the respective end of the first and second ends of the second transverse member;

removing the upper end of each wall of the pair of walls from between the respective first and second downwardly extending projections at the respective end of the first and second ends of the first transverse member; and removing the upper end of each wall of the pair of walls from between the respective first and second downwardly extending projections at the respective end of the first and second ends of the second transverse member.

Those skilled in the art will recognize, or be able to ascertain using no more than routine experimentation, many equivalents to the specific embodiments of the appliance and method described herein. Such equivalents are intended to be encompassed by the following claims.

What is claimed is:

1. An apparatus comprising:

a base;

a pair of walls that extend upwardly from the base, wherein the pair of walls are elongate along a first axis, wherein the pair of walls are parallel or generally parallel to each other, wherein each wall of the pair of walls defines an upper end, an inner surface, and an outer surface;

a plurality of transverse members having a respective first end and second end that are spaced along a second axis that is perpendicular to the first axis, wherein each transverse member of the plurality of transverse members comprises:

a top surface;

a bottom surface that is spaced from the top surface along a vertical axis that is perpendicular to each of the first axis and the second axis;

a respective first downwardly extending projection and second downwardly extending projection at each end of the first end and the second end, wherein the respective first downwardly extending projection and second downwardly extending projection are spaced from each other along the second axis, wherein the upper end of a respective wall of the pair of walls is received between the respective first downwardly extending projection and second downwardly extending projection; and at least one cross member to support sample media, which extends between at least two of the transverse members along the first axis and rests upon the at least two of the transverse members.

2. The apparatus of claim 1, wherein the at least one cross member comprises at least one receiving slot formed in the at least one cross member and configured to receive sample media.

3. The apparatus of claim 2, wherein each at least one cross member comprises a top portion and a bottom portion that cooperate to define the at least one receiving slot therebetween.

4. The apparatus of claim 2, wherein each at least one cross member has a width between a first side and a second side that are spaced along the second axis, wherein the at least one receiving slot extends continuously through said cross member from the first side to the second side.

5. The apparatus of claim 2, wherein each at least one cross member has a width between a first side and a second side that are spaced along the second axis, wherein the at least one receiving slot comprises:

a first receiving slot that extends inwardly from the first side through only a portion of the width of said cross member; and a second receiving slot that extends inwardly from the second side through only a portion of the width of said cross member.

6. The apparatus of claim 5, wherein each cross member comprises a web that extends between a top portion of the transverse member and a bottom portion of the transverse member, wherein the web divides the first receiving slot from the second receiving slot.

7. The apparatus of claim 1, wherein the at least one cross member comprises a downwardly extending tab that extends downwardly past outer sides of one of the transverse members upon which the at least one cross member rests.

8. The apparatus of claim 7, wherein the at least one cross member comprises a transverse slot, bounded in part by the downwardly extending tab, to receive into the transverse slot at least an upper portion of the transverse member upon which the at least one cross member rests.

9. The apparatus of claim 1, wherein each wall has a respective thickness between the inner surface and the outer surface of the wall, wherein the first downwardly extending projection and the second downwardly extending projection are spaced from each other along the second axis according to an interference fit with the respective wall so that the first downwardly extending projection and the second downwardly extending projection respectively bias against the inner surface and the outer surface of the respective wall.

10. The apparatus of claim 1, wherein each transverse member of the plurality of transverse members comprises, at each of the first end and the second end, a third downwardly extending projection that is spaced from the second downwardly extending projection along the first axis.

11. The apparatus of claim 1, wherein each wall has opposing first and second longitudinal ends that are spaced along the first axis, wherein each wall of the pair of walls defines a respective stop at each of the first longitudinal end and second longitudinal end, wherein each of the stops at the first longitudinal end and second longitudinal end of each wall inhibits a transverse member of the plurality of transverse members from sliding past said stop.

12. The apparatus of claim 1, further comprising a plurality of sub-members coupled together by at least one coupling member and spaced apart from each other to support sample media therebetween.

13. The apparatus of claim 12, wherein each sub-member of the plurality of sub-members comprises: a top portion that defines a top surface, a side portion that defines a side surface, and a plurality of cutouts; wherein the top portion and side portion cooperate to define a given cutout of the plurality of cutouts formed in the sub-member.

14. The apparatus of claim 13, wherein each sub-member of the plurality of sub-members has a width between a first side and a second side that are spaced along the first axis, and a height between the top surface and a bottom surface that are spaced along the vertical axis, wherein:

a given cutout of the plurality of cutouts extends inwardly from the first side through only a portion of the width of the sub-member; and the given cutout extends downwardly from the top surface through only a portion of the height of the sub-member.

15. The apparatus of claim 13, wherein an opposing pair of the plurality of cutouts, formed in the plurality of sub-members, together define a circular composite cutout.

16. The apparatus of claim 13, wherein an opposing pair of the plurality of cutouts, formed in the plurality of sub-members, together define an angular composite cutout including a tapered end and a square end.

17. The apparatus of claim 13, wherein an opposing pair of the plurality of cutouts, formed in the plurality of sub-members, are formed by shapes that are different from each other.

18. The apparatus of claim 1, wherein the base comprises:

a first portion that couples to a first wall of the pair of walls;

a second portion that couples to a second wall of the pair of walls; and at least one transverse portion that extends between, and couples to the first portion and the second portion.

19. The apparatus of claim 1, wherein each wall of the pair of walls has a lower end that is spaced from the upper end along the vertical axis, wherein the base defines a respective receptacle that receives the lower end of each wall with an interference fit.

20. The apparatus of claim 1, wherein the pair of walls are integrally formed with the base.

21. The apparatus of claim 1, wherein the upper end of each wall of the pair of walls defines a convex surface, and wherein a complementary concave surface is formed in the transverse members between the first and second downwardly extending projections of the transverse members.

22. The apparatus of claim 1, wherein the upper end of each wall of the pair of walls includes one or more notches to retain the transverse members in discrete positions along respective lengths of the walls, and wherein the transverse members include complementary features, between the first and second downwardly extending projections of the transverse members on each end of the transverse members, that are receivable into the notches of the upper end of the walls.

23. The apparatus of claim 1, wherein each of the plurality of transverse members comprises two sub-members.

24. A method of using the apparatus as in claim 1, the method comprising:

inserting a first end of a media into a first cutout of a first sub-member of a given transverse member of the plurality of transverse members; and inserting an opposing second end of the media into a first cutout of a second sub-member of the given transverse member.

25. The method of claim 24, further comprising:

moving the first transverse member relative to the second transverse member along the first axis.

26. The method of claim 24, wherein the media comprises polytetrafluoroethylene (PTFE)-coated fiberglass or a flame-resistant material.

27. The method of claim 24, further comprising applying a sample onto the media.

28. The method of claim 24, wherein the media is a first media, the method further comprising:

inserting a first end of a second media into a second cutout of the first sub-member of the given transverse member; and inserting an opposing second end of the second media into a second cutout of the second sub-member of the given transverse member, wherein the second media is a second type of media that is different than the first type.

29. The apparatus of claim 12, wherein a first spacing along the first axis, between first and second sub-members of a first transverse member of the plurality of transverse members, is different than a second spacing along the first axis between first and second sub-members of a second transverse member of the plurality of transverse members.

30. The method of claim 24, wherein each wall of the pair of walls has a lower end that is spaced from the upper end along the vertical axis, wherein the base defines a respective receptacle that receives the lower end of each wall with an interference fit, the method further comprising:

inserting the lower end of each wall of the pair of walls into the respective receptacle of the base;

positioning the upper end of each wall of the pair of walls between the respective first downwardly extending projection and second downwardly extending projection at the respective end of the first end and second end of a first transverse member of the plurality of transverse members;

positioning the upper end of each wall of the pair of walls between the respective first downwardly extending projection and second downwardly extending projection at the respective end of the first end and second end of a second transverse member of the plurality of transverse members;

removing the upper end of each wall of the pair of walls from between the respective first downwardly extending projection and second downwardly extending projection at the respective end of the first end and second end of the first transverse member; and removing the upper end of each wall of the pair of walls from between the respective first downwardly extending projection and second downwardly extending projection at the respective end of the first end and second end of the second transverse member.

* * * * *